United States Patent [19]

Herren et al.

[11] Patent Number: 5,123,965
[45] Date of Patent: Jun. 23, 1992

[54] PROCESS FOR STABILIZING BISMUTH VANADATE PIGMENTS AGAINST ATTACK BY HYDROCHLORIC ACID

[75] Inventors: Fritz Herren, Düdingen, Switzerland; Leonardus J. H. Erkens, Maastricht, Netherlands

[73] Assignee: Ciba-Geigy Corporation, Ardsley, N.Y.

[21] Appl. No.: 616,556

[22] Filed: Nov. 21, 1990

[30] Foreign Application Priority Data

Nov. 30, 1989 [CH] Switzerland .......... 4300/89

[51] Int. Cl.$^5$ .......... C09C 3/06; C04B 14/36; C01G 31/02; C01G 29/00
[52] U.S. Cl. .......... 106/462; 106/419; 106/461; 106/479; 423/593
[58] Field of Search .......... 106/419, 461, 462, 479; 423/593

[56] References Cited

U.S. PATENT DOCUMENTS

| | | | |
|---|---|---|---|
| 3,370,971 | 2/1968 | Linton | 106/434 |
| 3,513,007 | 5/1970 | Ledeter | 106/438 |
| 3,639,133 | 2/1972 | Linton | 106/434 |
| 3,899,342 | 8/1975 | Birchall et al. | 501/127 |
| 3,976,810 | 8/1976 | Hecht | 427/371 |
| 4,010,294 | 3/1977 | Birchall et al. | 427/226 |
| 4,026,722 | 5/1977 | Hess | 423/593 |
| 4,046,588 | 9/1977 | Einerhand et al. | 106/434 |
| 4,110,492 | 8/1978 | Hayman | 106/409 |
| 4,230,500 | 10/1980 | Balducci et al. | 106/479 |
| 4,251,283 | 2/1981 | Balducci et al. | 106/479 |
| 4,758,281 | 7/1988 | Eckler et al. | 106/467 |
| 4,851,049 | 7/1989 | Weinand et al. | 106/479 |
| 4,937,063 | 6/1990 | Sullivan | 423/593 |

FOREIGN PATENT DOCUMENTS 747780 3/1944 Fed. Rep. of Germany.

OTHER PUBLICATIONS

Chem. Abst. 94, 48912s (1981).
Chem. Abst. 96, 201334t (1982).

*Primary Examiner*—William R. Dixon, Jr.
*Assistant Examiner*—Scott L. Hertzog
*Attorney, Agent, or Firm*—Luther A. R. Hall; Harry Falber

[57] ABSTRACT

A process for stabilizing bismuth vanadate pigments against attack by hydrochloric acid by treating said pigments with a metal phosphate, which process comprises treating an aqueous suspension of a bismuth vanadate pigment with 2-20% by weight, based on said pigment, of an orthophosphate selected from the group consisting of calcium, magnesium, aluminium, zirconium and titanium orthophosphate, of a mixture of such orthophosphates with one another or of such orthophosphates with zinc orthophosphate, with stirring, in the temperature range from 20° to 100° C. and in the pH range from 2 to 8, which orthophosphate is precipitated in situ from the appropriate metal salt of a strong mineral acid and orthophosphoric acid or from an alkali metal salt thereof, and isolating the resultant product by conventional methods.

The pigments so obtained have excellent resistance to hydrochloric acid.

6 Claims, No Drawings

PROCESS FOR STABILIZING BISMUTH VANADATE PIGMENTS AGAINST ATTACK BY HYDROCHLORIC ACID

The present invention relates to a process for stabilising bismuth vanadate pigments against attack by hydrochloric acid by treating said pigments with specific metal phosphates.

It is taught in U.S. Pat. No. 4,752,460 that the stability of bismuth vanadate pigments containing alkaline earth metals and/or zinc and molybdate or tungstenate to, for example, attack by chemicals, can be enhanced by providing said pigments with an inorganic protective coating of aluminium, titanium, antimony, cerium, zirconium or silicone compounds or zinc phosphate. It is further taught in U.S. Pat. No. 4,455,174 that the stability of bismuch vanadate pigments containing molybdate or tungstenate can be enhanced by coating said pigments with a sparingly soluble inorganic compound such as zirconium silicate, alumina, aluminium phosphate and antimony(III) oxide. However, none of the publications referred to specifically discloses a phosphate encapsulation.

In U.S. Pat. No. 3,946,134 it is disclosed that, for example, the stability to chemicals of a solid particulate substrate such as an inorganic pigment is improved by encapsulating each particle with a continuous layer of an aluminium phosphate complex, formed in situ, which optionally contains a fluoride. It is said, however, that the sulfates, chlorides and nitrates of aluminium are not suitable for forming the aluminium phosphate complex.

Contrary to this teaching, it has now been found that the stability of a bismuth vanadate pigment to hydrochloric acid can most surprisingly be enhanced by treating an aqueous suspension of said pigment with a metal orthophosphate obtained in situ from the readily accessible chlorides, nitrates or, in particular, sulfates.

Accordingly, the present invention relates to a process for stabilising bismuth vanadate pigments against attack by hydrochloric acid by treating said pigments with a metal phosphate, which process comprises treating an aqueous suspension of a bismuth vanadate pigment with 2-20% by weight, based on said pigment, of an orthophosphate selected from the group consisting of calcium, magnesium, aluminium, zirconium and titanium orthophosphate, of a mixture of such orthophosphates with one another or of such orthophosphates with zinc orthophosphate, with stirring, in the temperature range from 20° to 100° C. and in the pH range from 2 to 8, which orthophosphate is precipitated in situ from the appropriate metal salt of a strong mineral acid and orthophosphoric acid or from an alkali metal salt thereof, and isolating the resultant product by conventional methods. If desired, and in analogy to the process described in U.S. Pat. No. 3,946,134, a fluoride may also be used together with the orthophosphate in a molar ratio of F:P of 0.1 to 2. The product so obtained can be subjected to a subsequent optional heat treatment in the temperature range from 100° to 500° C.

The bismuth vanadate pigments to be stabilised by the process of this invention are generally known to those skilled in the art.

The process of this invention is particularly suitable for stabilising bismuth vanadate pigments of formulae $$BiVO_4 \qquad (I)$$

and $$(Bi,A)(V,D)O_4 \qquad (II),$$

wherein A is an alkaline earth metal, Zn or a mixture thereof, and D is Mo, W or a mixture thereof, and the molar ratio of A to Bi is from 0.1 to 0.4 and the molar ratio of D to V is from 0 to 0.4.

Bismuth vanadate pigments of formula I are disclosed in U.S. Pat. No. 4,115,141.

The bismuth vanadate pigments of formula II are disclosed in U.S. Pat. No. 4,752,460. They have a tetragonal scheelite-like crystal structure. The hue can be influenced by the molar ratio of A to Bi and D to V.

The segment (Bi,A) in formula II above will be understood as representing that the bismuth is in the form of the bismuth(III) ion and is partially replaced by the divalent metal cation A.

Vanadium, however, as pentavalent vanadium ion is in the form of the vanadate ion and may be partially replaced by the hexavalent metal cation D as molybdate or tungstenate or mixtures thereof.

An alkaline earth metal A may be Be, Mg, Ca, Sr and Ba, preferably Ca and Sr. D is preferably Mo.

By mixtures are meant with respect to compounds of formula II mixtures of at least one alkaline earth metal and Zn or mixtures of different alkaline earth metals, as well as mixtures of Mo and W, in any molar ratios.

Preferred molar ratios of A to Bi are 0.2 to 0.35, Preferred molar ratios of D to V are 0.001 to 0.2.

Compounds of formula II, wherein A is Ca or Sr and D is Mo or W, are preferred.

Preferred compounds of formula II are those wherein A is Ca and D is Mo, and the molar ratios of Ca to Bi are from 0.2 to 0.35 and of Mo to V from 0.01 to 0.2.

The stability to hydrochloric acid of the pigments aftertreated by the process of this invention will naturally increase with increasing amounts of orthophosphate; but too great amounts will have an adverse effect on other pigment properties such as colour strength. In the process of this invention it is therefore preferred to use 5-15% by weight of orthophosphate, based on the pigment.

The calcium, magnesium, zirconium, titanium or, preferably, the aluminium salt and optionally the zinc salt of a strong mineral acid, i.e. for example a chloride, nitrate or, in particular, a sulfate, are conveniently added to the aqueous pigment suspension in solution with constant stirring. Subsequently, with constant stirring, the orthophosphoric acid or an alkali metal salt thereof is added, while keeping the pH of the medium within the range from 2 to 8. It is, however, also possible first to add the orthophosphate to the pigment suspension and only afterwards the metal salt. The temperature can vary in the range from 20° to 100° C. The metal orthophosphate then usually precipitates in less than 20 minutes. The slurry is thereafter conveniently stirred for ¼ hour to 3 hours, and the product is then neutralised in an optional step, isolated by filtration, washed with water, and dried.

The phosphate ions are preferably added in the form of orthophosphoric acid or of a sodium salt thereof.

The preferred orthophosphate is aluminium orthophosphate, preferably in conjunction with zinc orthophosphate, which is conveniently prepared from aluminium sulfate or aluminium and zinc sulfate and orthophosphoric acid or a sodium salt thereof. The aluminium orthophosphate can, however, also be prepared from aluminium sulfate which is prepared in situ from sodium aluminate and sulfuric acid, and orthophosphoric acid.

If necessary, the fluoride ions are preferably added in soluble form to the slurry. Hydrofluoric acid, sodium fluoride and, preferably, ammonium bifluoride, have been found especially suitable for this purpose. The fluoride ions can be added together with, or after the addition of, the metal salt or the phosphate ions.

To improve specific pigment properties the products obtained by the process of this invention can additionally be treated with texture improvers, for example with long-chain aliphatic alcohols, esters, acids or salts thereof, amines, amides, waxes or resin-like substances such as abietic acid or the hydrogenation products, esters or salts thereof, and also with nonionic, anionic or cationic surfactants.

If desired, the pigments obtainable by the process of the invention can be converted into dust-free pigment preparations, for example as described in U.S. Pat. No. 4,762,523.

The products obtained by the process of the invention have good pigment properties and are eminently suitable for pigmenting high molecular weight organic materials, for example cellulose ethers and esters such as ethyl cellulose, acetyl cellulose and nitrocellulose, polyamides and polyurethanes or polyesters, natural resins or synthetic resins, especially urea/formaldehyde and melamine/formaldehyde resins, alkyd resins, phenolic plastics, polycarbonates, polyphenylene oxides, polyolefins such as polyethylene, polypropylene and polystyrene, polyvinyl chloride, polyacrylonitrile, polyacrylates, fluoropolymers such as polyfluoroethylene, polytrifluorochloroethylene or tetrafluoroethylene/hexafluoropropylene copolymer, and also thermoplastic or curable acrylic resins, rubber, casein, silicone and silicone resins, singly or in mixtures (for example ABS). These high molecular weight compounds can be in the form of plastics, melts or of spinning solutions, paints or printing inks.

The preferred utility of the pigments obtained by the process of this invention is for pigmenting paints and lacquers, especially automotive lacquers.

For pigmenting lacquers, paints and printing inks, the high molecular weight organic materials and the pigments obtained by the process of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The high molecular weight organic material may contain the pigments obtained by the process of this invention in an amount of 0.01 to 40% by weight, preferably 0.1 to 20% by weight, based on said material.

When used for colouring plastics materials, fibres, paints and lacquers or printing inks, the pigments obtained by the process of this invention have good all-round pigment properties such as good dispersibility, high colour strength, purity and opacity, good fastness to overspraying, migration, heat, light and weathering, as well as good resistance to chemicals such as acids, bases and organic solvents, but are especially distinguished by their very good resistance to hydrochloric acid and to industrial atmosphere. Furthermore, they impart good rheological properties to the printing inks, paints and lacquers coloured with them and good gloss to the dried finish.

The invention is illustrated by the following Examples.

EXAMPLE 1

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 80° C. by blowing in steam and stirred for 15 minutes. With constant stirring, a solution of 14.30 g of $Al_2(SO_4)_3.18 H_2O$ in 120 ml of water (pH after addition 3.2) is first added at 80° C. over 15 minutes, followed by the addition of 5.6 g of 75% orthophosphoric acid in 120 ml of water also over 15 minutes. The pH is then 2.2. The pH is subsequently adjusted with 10% aqueous sodium hydroxide solution to 6.5, still at 80° C. and with further stirring. The suspension is further stirred for ½ hour and filtered. The filter cake is washed three times with 500 ml of water and dried at 90° C.

EXAMPLE 2

10 g of the bismuth vanadate pigment of formula $(Bi,Ca)(V,Mo)O_4$, prepared in accordance with Example 2 of U.S. Pat. No. 4,752,460, are dispersed by means of a high-performance stirrer (®Ultra-Turrax, supplied by Janke und Kunkel KG, Stauffen, FRG) in a solution of 0.80 g of sodium aluminate ($Al_2O_3$, 53%) in 100 ml of water (10 minutes at 6000 rpm). 0.96 g of orthophosphoric acid (84%) and 27 ml of 1N sulfuric acid are bulked with water to a volume of 100 ml and added dropwise, with stirring, to the above pigment suspension. The pH is adjusted to 2.4 with dilute aqueous sodium hydroxide solution, the suspension is heated to 60° C. and stirred for 2 hours at this temperature, while keeping the pH between 2.4 and 2.5. The suspension is thereafter heated to 90° C. and stirred for a further hour. The product is isolated by filtration, washed with water, and dried.

EXAMPLE 3

Example 2 is repeated, with the sole exception that 0.47 g of ammonium bifluoride is added together with the 0.96 g of orthophosphoric acid and the 27 ml of 1N sulfuric acid.

EXAMPLE 4

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 15.2 g of $Al_2(SO_4)_3.18 H_2O$ and 12.5 g of $ZnSO_4.7 H_2O$ in 120 ml of water (pH after addition 3.4) is added over 10 minutes, followed by the addition of 9.70 g of 75% orthophosphoric acid in 120 ml of water. The pH is then 2.3. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 5

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 2.8 g of $Al_2(SO_4)_3 \cdot 18 H_2O$ and 2.3 g of $ZnSO_4 \cdot 7 H_2O$ in 120 ml of water (pH after addition 4.6) is added over 10 minutes, followed by the addition of 1.9 g of 75% orthophosphoric acid in 120 ml of water. The pH is then 2.9. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 6

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 34.1 g of $Al_2(SO_4)_3 \cdot 18 H_2O$ and 27.9 g of $ZnSO_4 \cdot 7 H_2O$ in 300 ml of water (pH after addition 2.9) is added over 10 minutes, followed by the addition of 21.9 g of 75% orthophosphoric acid in 120 ml of water. The pH is then 1.7. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 7

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 7.6 g of $MgSO_4$ and 12.5 g of $ZnSO_4 \cdot 7 H_2O$ in 120 ml of water (pH after addition 3.4) is added over 10 minutes, followed by the addition of 9.7 g of 75% orthophosphoric acid in 120 ml of water. The pH is then 2.5. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 8

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 7.3 g of $Zr(SO_4)_2$ and 12.5 g of $ZnSO_4 \cdot 7 H_2O$ in 120 ml of water (pH after addition 5.1) is added over 10 minutes, followed by the addition of 9.7 g of 75% orthophosphoric acid in 120 ml of water. The pH is then 2.5. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 9

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 5.1 g of $TiOSO_4$ and 12.5 g of $ZnSO_4 \cdot 7 H_2O$ in 120 ml of water (pH after addition 2.8) is added over 10 minutes, followed by the addition of 9.7 g of 75% orthophosphoric acid in 120 ml of water. The pH is then 2.2. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 10

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 12.8 g of $Ca(NO_3)_2 \cdot 4 H_2O$ and 12.5 g of $ZnSO_4 \cdot 7 H_2O$ in 120 ml of water (pH after addition 5.4) is added over 10 minutes, followed by the addition of 9.7 g of 75% orthophosphoric acid in 120 ml of water. The pH is then 2.3. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 11

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 16.4 g of $Mg(NO_3)_2 \cdot 6 H_2O$ and 12.5 g of $ZnSO_4 \cdot 7 H_2O$ in 120 ml of water (pH after addition 5.3) is added over 10 minutes, followed by the addition of 9.7 g of 75% orthophosphoric acid in 120 ml of water. The pH is then 2.4. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 12

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 17.2 g of $Al(NO_3)_3 \cdot 9 H_2O$ and 12.5 g of $ZnSO_4 \cdot 7 H_2O$ in 120 ml of water (pH after addition 3.7) is added over 10 minutes, followed by the addition of 9.7 g of 75% orthophosphoric acid in 120 ml of water. The pH is then 2.1. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 13

100 g of the bismuth vanadate pigment of formula $(Bi,Ca)(V,Mo)O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 13.0 g of $MgCl_2 \cdot 6 H_2O$ and 12.5 g of $ZnSO_4 \cdot 7 H_2O$ in 120 ml of water (pH after addition 5.3) is added over 10 minutes, followed by the addition of 9.7 g of 75% orthophosphoric acid in 120 ml of water. The pH is then 2.4. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 14

100 g of the bismuth vanadate pigment of formula (Bi, Ca)(V, Mo)$O_4$, prepared in accordance with Example 2 of U.S. Pat. No. 4,752,460, are suspended in 2 liters of water. The suspension is heated to 90° C. by blowing in steam and stirred for 15 minutes. By means of a metering pump and with stirring, 15.2 g of $Al_2(SO_4)_3.18 H_2O$ and 12.9 g of $Zn(NO_3)_2.6 H_2O$ in 120 ml of water (pH after addition 3.5) is added over 10 minutes, followed by the addition of 9.7 g of 75% orthophosphoric acid in 120 ml of water. The pH is then 2.2. The pH is subsequently adjusted with 10% aqueous sodium hydroxide solution to 6.5. The suspension is further stirred for ½ hour and filtered. The filter cake is washed three times with 500 ml of water and dried at 90° C.

EXAMPLE 15

10 g of the bismuth vanadate pigment of formula $BiVO_4$ are dispersed in 100 ml of water by means of a high-performance stirrer (10 min., 6000 rpm). The pH is adjusted to 4 with dilute hydrochloric acid. The dispersion is then heated to 90° C. and a solution of 0.83 g of $CaCl_2$ in 50 ml of water and a solution of 0.86 g of 84% orthophosphoric acid in 50 ml of water are added simultaneously over 2 hours. The suspension is stirred for 1 hour, then filtered, and the filter cake is washed free of salt and dried.

EXAMPLE 16

10 g of the bismuth vanadate pigment of formula (Bi, Zn)(V, MO)$O_4$, prepared in accordance with Example 6 of U.S. Pat. No. 4,752,460, are dispersed in 100 ml of water containing 1.8 g of 84% orthophosphoric acid by means of a high-performance stirrer (10 min., 6000 rpm). Then 14.7 g of an aqueous solution of $TiOCl_2$ containing 11.5 mmol of $TiCl_4$ are added. The suspension is stirred for ½ hour, the pH is adjusted to neutral, and the product is isolated by filtration, washed and dried.

EXAMPLE 17

Use Example 9 g of an alkyd melamine lacquer of the following composition:

| | |
|---|---|
| 54 | g of alkyd resin ®Beckosol 321 (60% in xylene) |
| 32.4 | g of melamine resin ®Super Beckamin NP 100 (50% in xylene) |
| 1.8 | g of 1-methoxy-2-propanol |
| 11.35 | g of xylene |
| 0.45 | g of silicone oil A (1% in xylene) | together with 1 g of the pigment prepared in Example 2 and 40 g of glass beads (diameter 3 mm) are put into a 30 ml reagent bottle and dispersed for 16 hours on a vibrator.

The lacquer is drawn to a film on a paint panel (wet film thickness 100 μm), dried in the air for 10 minutes and baked for 30 minutes at 115° C.

The test for acid stability is made as follows:

Ca. 3 cm$^2$ of the lacquer film are covered with 8% hydrochloric acid and a watch glass is placed over the acid-coated film, which is allowed to stand for 4 hours at 23°±1° C. The film is then thoroughly washed with water. The slightly brownish discolouration turns green over 24 hours. The discolouration of the lacquer prepared in this Example is less pronounced than that of a similar lacquer which contains the same, but untreated, pigment.

What is claimed is:

1. A process for stabilizing a bismuth vanadate pigment against attack by hydrochloric acid which comprises treating an aqueous suspension of said pigment with 2–20% by weight, based on said pigment, of aluminum orthophosphate or a mixture of aluminum orthophosphate with zinc orthophosphate, with stirring in the temperature range from 20° to 100° C. and in the pH range from 2 to 8, which aluminum orthophosphate is precipitated in situ from aluminum sulfate and orthophosphoric acid or an alkali metal salt thereof, wherein the aluminum sulfate is in turn prepared in situ from sodium aluminate and sulfuric acid, and isolating the resultant product.

2. A process according to claim 1, wherein the bismuth vanadate pigment is a pigment of formula $$BiVO_4 \qquad (I)$$

and $$(Bi,A)(V,D)O_4 \qquad (II),$$

wherein A is an alkaline earth metal, Zn or a mixture thereof, and D is Mo, W or a mixture thereof, and the molar ratio of A to Bi is from 0.1 to 0.4 and the molar ratio of D to V is from 0 to 0.4.

3. A process according to claim 2 for stabilizing a bismuth vanadate pigment of formula II, wherein A is Ca or Sr and D is Mo or W, and the molar ratios of A to B are from 0.2 to 0.35 and of D to V from 0.01 to 0.2.

4. A process according to claim 2 for stabilizing a bismuth vanadate pigment of formula II, wherein A is Ca and D is Mo, and the molar ratios of Ca to Bi are from 0.2 to 0.35 and of D to V from 0.01 to 0.2.

5. A process according to claim 1, wherein 5–15% by weight of orthophosphate, based on the pigment, is used.

6. A process according to claim 1, wherein the aluminium orthophosphate and the zinc orthophosphate are prepared from aluminium sulfate zinc sulfate and orthophosphoric acid or a sodium salt thereof.

* * * * *